(12) United States Patent
Warmoth

(10) Patent No.: US 7,039,968 B1
(45) Date of Patent: May 9, 2006

(54) HINGE ASSEMBLY FOR FOLDING DINETTE

(76) Inventor: Mark Warmoth, 30337 Big River Dr., Canyon Lake, CA (US) 92587

( * ) Notice: Subject to any disclaimer, the term of this patent is extended or adjusted under 35 U.S.C. 154(b) by 0 days.

(21) Appl. No.: 10/963,674

(22) Filed: Oct. 13, 2004

(51) Int. Cl.
*A47C 17/48* (2006.01)

(52) U.S. Cl. .................................. 5/118; 5/12.1; 5/136
(58) Field of Classification Search .................. 5/3, 5/7, 12.1, 57.1, 118, 119, 136; 297/63; 196/174
See application file for complete search history.

(56) References Cited

U.S. PATENT DOCUMENTS

| | | | |
|---|---|---|---|
| 3,916,462 A * | 11/1975 | Riches | 5/9.1 |
| 4,005,898 A * | 2/1977 | Way | 296/174 |
| 4,190,911 A * | 3/1980 | Wadsworth | 5/44.1 |
| 5,536,042 A * | 7/1996 | Williams et al. | 280/749 |
| 5,638,560 A * | 6/1997 | Rigdon et al. | 5/118 |
| 6,163,900 A * | 12/2000 | Stevenson | 5/118 |
| 6,212,710 B1 * | 4/2001 | Jones | 5/118 |
| 6,644,724 B1 * | 11/2003 | Penaloza et al. | 296/190.2 |

* cited by examiner

*Primary Examiner*—Michael Trettel
(74) *Attorney, Agent, or Firm*—John Joseph Hall

(57) ABSTRACT

An improved hinge assembly for connecting the inner end of conventional folding dinette furniture in a position against the side wall of a recreational vehicle or other structure by locating the pivot point of the hinge of the hinge assembly at the top of a hinge support frame mounted at the inner end of conventional folding dinette furniture.

4 Claims, 3 Drawing Sheets

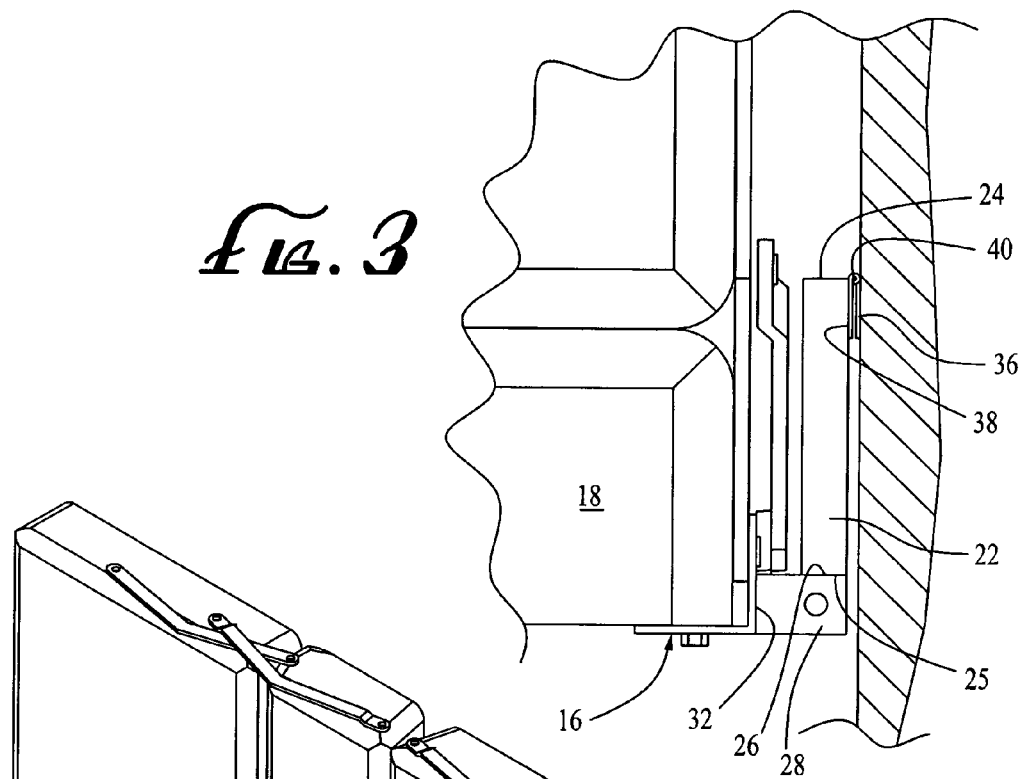
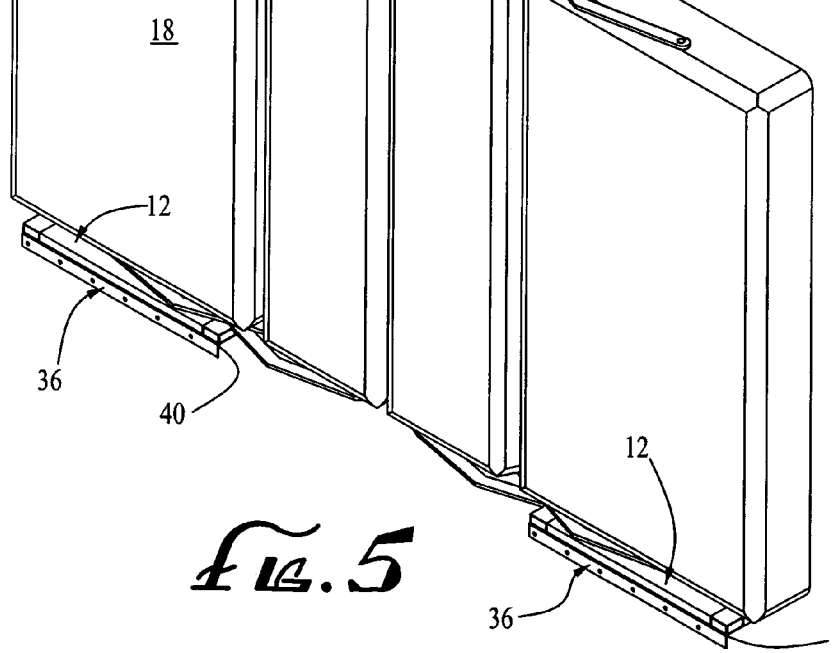

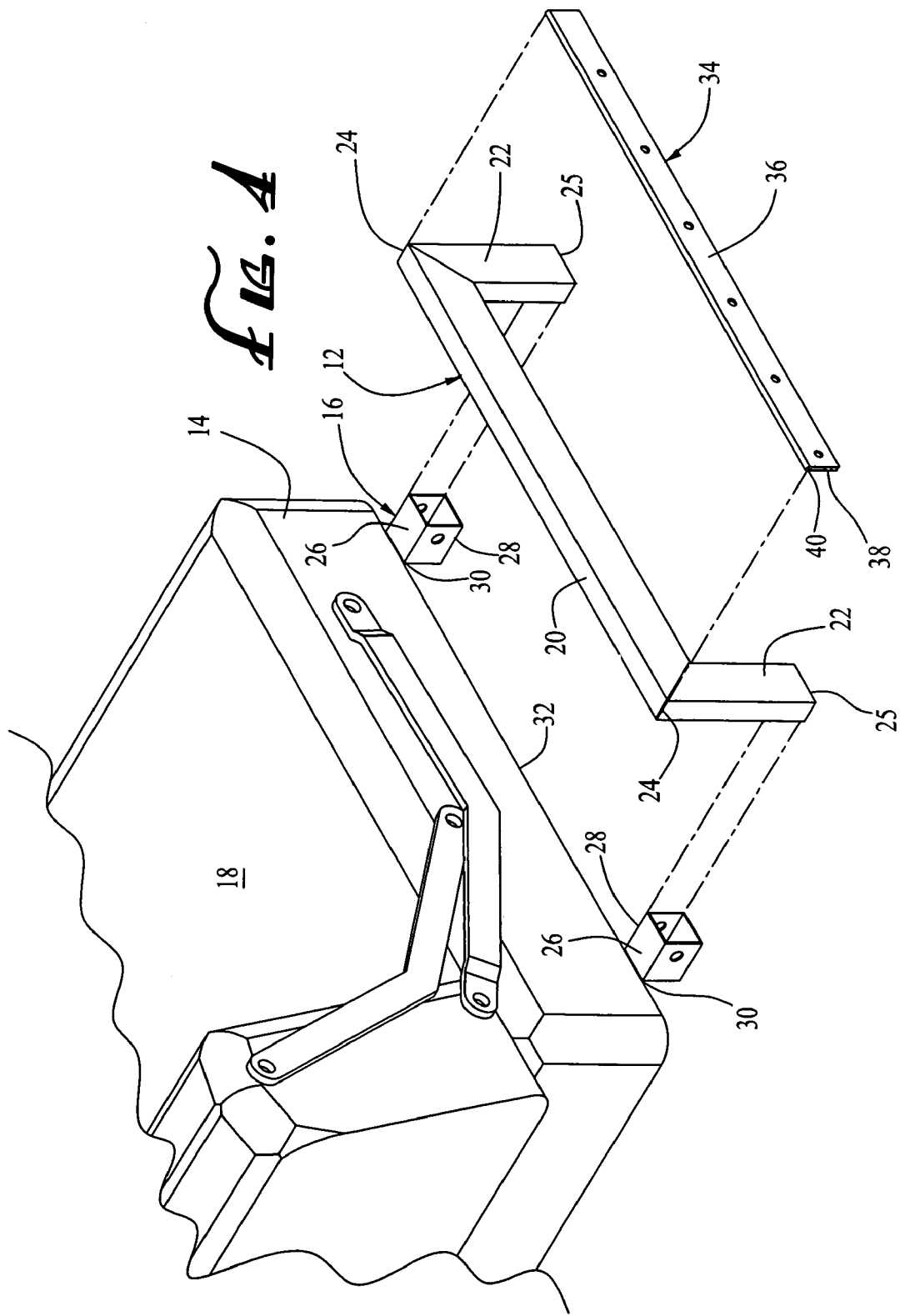

HINGE ASSEMBLY FOR FOLDING DINETTE

BACKGROUND OF THE INVENTION

This invention relates to an improved hinge connection for conventional folding dinette furniture for recreational vehicles and other applications that allows such furniture, when placed in its down or use position, to have its inner end located against the wall of recreational vehicles and the wall of other structures, thereby saving substantial space while in use.

Conventional folding dinette furniture for an RV or other structure requires a substantial amount of space between a wall of the RV or other structure and the inner end of the dinette when the dinette is placed in its down position for use.

Applicant is unaware of any prior art that provides for a position of a dinette in its use position for an RV or other structure which is against the wall of an RV or other structure.

OBJECTS OF THE INVENTION

Accordingly, an object of the invention is to provide a hinged connection between conventional folding dinette furniture for an RV or other structure which permits the location of the inner end of the dinette in its down or use position against the wall of an RV or other structure, thereby saving a substantial amount of space.

Another object of the invention is to provide a hinged connection which allows conventional folding dinette furniture for RVs and other structures to be located when in a down or use position against a wall of an RV or other structure but which uses relatively few and readily available component parts.

A further object of the invention is to provide a hinged connection which allows conventional folding dinette furniture for RVs and other structures to be located when in a down or use position against a wall of an RV or other structure without requiring substantial modification of the parts or configuration of a conventional dinette for an RV.

These and other objects are more readily understood by reference to the following brief description of the drawings of the invention and detailed description of preferred embodiments of the invention.

BRIEF DESCRIPTION OF THE DRAWINGS

FIG. 3 is an enlarged detail front elevational view of an embodiment of the invention FIG. 4 is an exploded perspective view of an embodiment of the invention FIG. 5 is a perspective view of an embodiment of the invention.

DETAILED DESCRIPTION OF PREFERRED EMBODIMENTS

Figure 1:
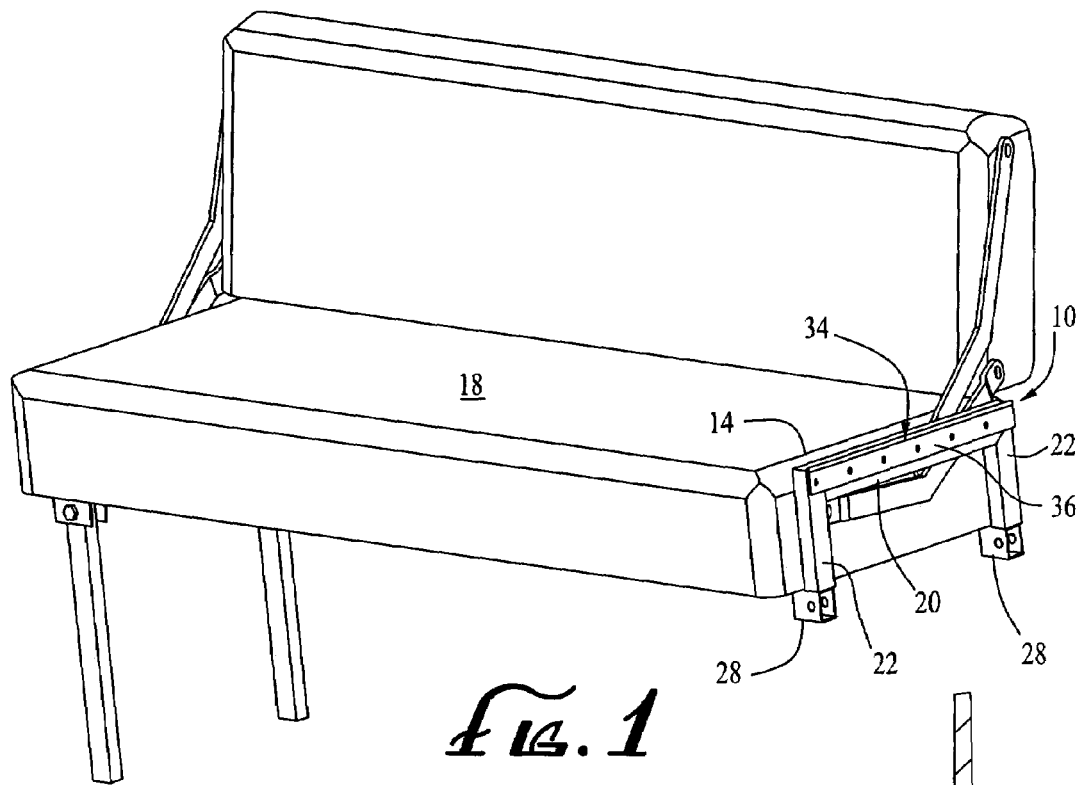
FIG. 1 is a perspective view of an embodiment of the invention.
Figure 2:
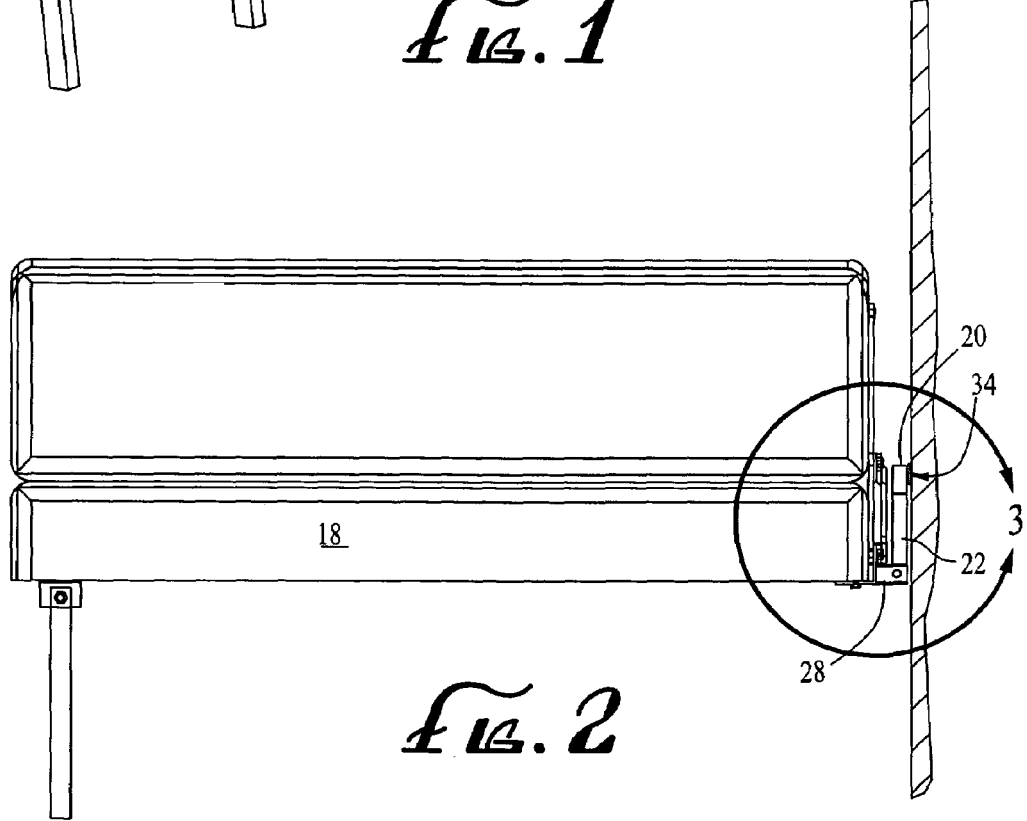
FIG. 2 is a front elevational view of an embodiment of the invention

Applicant's invention is designed for use in conjunction with conventional folding dinette furniture, as shown in the drawings.

An example of conventional folding dinette furniture is disclosed in U.S. Pat. No. 6,163,900 for application in a recreational vehicle. The folding dinette furniture shown in said patent uses at least 5 inches of space between the wall of an RV and the inner end of the dinette furniture in the down or use position. Applicant's invention overcomes this loss of space by the use of a hinge assembly which modifies the structure and capability of the hinge assembly used in the '900 patent and fulfills the objects of applicant's invention.

The hinge assembly 10 has a hinge support frame 12 which is securely attached by mounting it to the rear end 14 of the framework 16 of the conventional folding dinette furniture 18.

Hinge support frame 12 is preferably formed with an elongated horizontal top portion 20 supported by a vertical support member 22 formed or securely attached at its top end to each of the ends 24 of top portion 20. The support members 22 are securely attached at their bottom ends 25, one to each top 26 of a base member 28. Each base member 28 is mounted at each end 30 of the inner end 32 of the framework 16 of the conventional folding dinette furniture 18.

Hinge 34 has a hinge side wall plate 36 which is mounted by any suitable means to the side wall of a recreational vehicle or other structure and a hinge support plate 38 which is mounted by any suitable means to the hinge support frame 12. The upper ends of hinge side wall plate 36 and hinge support plate 38 are connected to a hinge pin 40 to form a flexible joint. Any other suitable means may be used to form the flexible joint. The hinge 34 is preferably located on hinge support plate 38 in a manner to allow the joint to be at the top of hinge support frame 12.

Due to the operation of the invention, when the folding dinette 18 is in its use position, its rear end 14 is located immediately next to the side wall of a recreational vehicle or other structure, without any space inbetween, thereby saving a considerable amount of space that would be required by the conventional installation of the folding dinette. When it is desired to store the folding dinette 18, the storage is easily accomplishing by folding its legs and rotating the folding dinette 18 which pivots around hinge pin 40 and arrives in its folded condition at the storage position against the side wall of a recreational vehicle or other structure.

Although I have described the invention in detail with reference to the accompanying drawings illustrating a preferred embodiment of the invention, it is understood that numerous changes may be made in the details of construction and arrangement of parts without departing from the spirit and scope of the invention as hereinafter claimed.

I claim:

1. A hinge assembly for locating conventional folding dinette furniture in its folded position up against the wall of a structure, and against the wall of a structure in its down position for use, said folding dinette furniture having framework formed with a front end and a rear end, said framework being formed to receive a cushion, comprising:
    (1) a hinge support frame securely attached to the rear end of said framework;
    (2) a flexible jointed hinge comprising a hinge support plate having an upper end, said hinge support plate being mounted to said hinge support frame, a wall plate having an upper end, said wall plate being mounted to said wall, and pivot means joining said upper end of said hinge support plate and said upper end of said support plate together to form said flexible jointed hinge.

2. A hinge assembly according to claim 1 in which said wall of said structure is a side wall of a recreational vehicle.

3. A hinge assembly according to claim 1 in which said hinge support frame is formed with an elongated horizontal top portion having two ends, each end of said horizontal top portion being supported by a vertical support member formed with a bottom end mounted to said framework.

4. A hinge assembly according to claim 1 in which said flexible jointed hinge comprises an elongated piano hinge having a hinge pin as a pivot and joining said upper end of said wall plate and said upper end of said hinge support plate together to form said flexible jointed hinge.

* * * * *